John Mead.
Impt's in Fluid Meters.
117094  PATENTED JUL 18 1871
Witnesses.
W. A. Saunders.
Sawd. Griffith
John Mead.
by his Attorney.
Frederick Curtis.
Fig. 2.
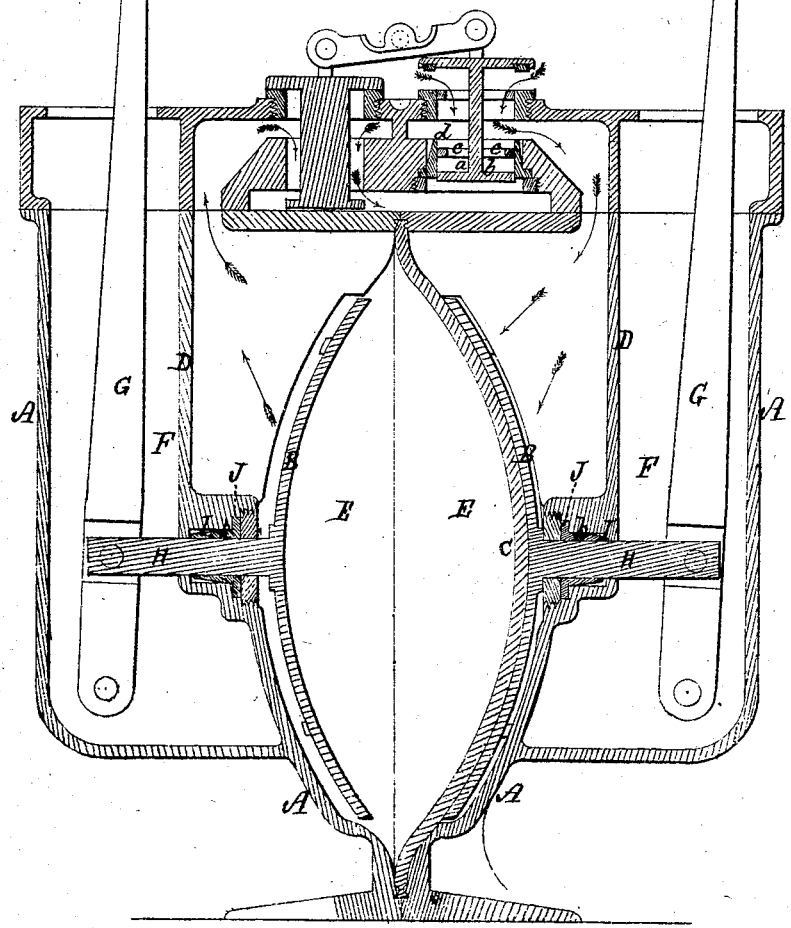
Fig. 1.

UNITED STATES PATENT OFFICE.

JOHN MEAD, OF CHARLESTOWN, MASSACHUSETTS.

IMPROVEMENT IN LIQUID-METERS.

Specification forming part of Letters Patent No. 117,094, dated July 18, 1871.

*To all whom it may concern:*

Be it known that I, JOHN MEAD, of Charlestown, in the county of Middlesex and State of Massachusetts, have made an invention of certain Improvements in Liquid-Meters; and do hereby declare the following to be a full, clear, and exact description thereof, due reference being had to the accompanying drawing making part of this specification, and in which—

Figure 1 is a vertical and longitudinal section of an instrument containing my improvements; Fig. 2 being a section of the tubular packing, to be hereinafter explained.

The improvements herein embodied and explained, and which comprise the subject-matter of these Letters Patent, have for their basis a class of instruments for measuring and registering the quantity of a flowing liquid, generally denominated "diaphragm-meters," or those in which the distensions, pulsations, or traversions of an elastic diaphragm, driven and carried alternately, and at intermittent periods of time, in opposite directions within a shallow circular chamber, by and with the body of liquid passing through the same, have the effect not only of determining and registering the amount of this liquid, but of effecting, as a medium whereby the liquid may act, the operation of the valve or valves which regulate the ingress and egress of such liquid.

An example of the class of meters to which this invention appertains is exhibited in Letters Patent of the United States numbered 90,479, and issued on the 25th day of May, 1869, to C. W. Baldwin.

In the class of meters above alluded to it was found essential to its successful operation to prevent passage of water through the arm-ports to the measuring-chamber. Among other devices which have been tried to effect this object an elastic partition has been employed, the center of which was made fast to the outer side of each diaphragm-disk, while its circumference was in turn secured to the adjacent portion of the case of the instrument immediately surrounding such arm-ports. I have found, in practical operation, that the inevitable expansion and contraction to which these elastic partitions are subject soon fractures or disintegrates them, and renders them worthless. Another very serious fault with the elastic partition has been demonstrated by the fact that, with varying degrees of pressure upon the fluid entering the instrument, a corresponding variance in the degree of expansion of the partition takes place, by which means the quantity of fluid passing through the instrument at one pulsation of the central diaphragm differs very much with different pressures, thus impairing very seriously the accuracy of the meter. Should the partition, in order to reduce the strain upon it, be made of a size equal to or approximating that of the diaphragm-disk, it would prevent action of the latter and stop operation of the instrument.

In lieu of the elastic partition, or any analogous device for preventing passage of water through or about the arm-ports to the measuring-chamber, I have employed a tube of a peculiar shape, of leather or other suitable material, elastic or non-elastic, which encompasses the rod connecting the diaphragm-disks and valve-operating arms.

The drawing accompanying this specification represents at A the outer case or shell of a fluid-meter, the metallic disks which regulate the movements of the central diaphragm being shown at B B, and the said diaphragm at C. D represents an integral partition cast in the case of each half or bowl of the meter-case, and separating the measuring-chamber E of the latter from its arm-operating inclosures F F, the rod which connects the disk B with the arm G being shown at H as passing through a passage, I, bored in the partition D. The inner portion of the hole or passage I is counterbored, as shown at J, for the reception of a tube, $k$, of leather or other suitable material, which is inserted therein, and closely surrounds the rod H and prevents flowage of fluid through the said passage into the measuring-chamber.

Although the tube $k$ may be made to encompass the rod with a degree of pressure sufficient to insure a tight joint, I prefer to scarf its outer end, as represented in the drawing, in order that the pressure of the water upon the thin lip thus formed may insure, beyond peradventure, and with little friction, an impassable barrier to passage of fluid at this point. The tubular plug or packing $k$ may be retained in place within its receptacle by a screw entering the latter, as shown, or by any suitable means.

The second portion of this invention, while bearing intimate relations to the meter hereinbefore referred to, relates to improvements in a class of valves shown and described in Letters Patent of the United States No. 95,476, and issued to Edmund H. Hewins, of Boston, on the 5th day of October, 1869.

In the valve therein presented the supporting-trunnions and pins are subject to wear, and to obviate the trouble resulting from this wear—that is, the lower valve upon one side being open, while the valve upon the opposite upper side was closed—I have heretofore so adjusted the latter that it is susceptible of a slight vertical play upon its pivot or support, which permits of some lowering of the two valves by wear of the trunnions, &c., and yet allows the lower to be pressed tightly to its seat, the upper being driven upon its seat by pressure of the fluid. This mode of procedure, however, has been found to impair the absolute balance of the valve, which it possesses when new and before it has been subjected to service, and, consequently, in use has necessitated the adoption of a spring to force the lower portion against its seat, since there is no counterpressure upon the opposite inlet-valve to effect such a result.

As it is important, however, that this pressure should be as light as possible for various reasons, I have designed, in this portion of my present invention, to restore to a great extent, if not entirely, this balance of the valve proper, and at the same time be able to dispense with any but a very light pressure, or one merely enough to insure the change of the valve or its tilting upon its fulcrums; and the device for this purpose consists in converting the lower portion $a$ of each valve into a hollow perforated piston or plunger, $b$, of such length as to permit of a lowering of the valve by means of wear, and yet insure the proper closing of the lower part, a series of escape-ports, $c\ c$, &c., being formed through the wall of the piston by which fluid is suffered to pass, and the piston being surrounded by an elastic packing, $d$, which is secured in a proper manner about it. As the outside pressure upon this packing is equal to the initial pressure thereupon, the former insures a tight joint between it and the piston, and I am not compelled to employ a spring or pressure to force the lower valve to its seat, as its tendency to leave it is counterbalanced by the pressure upon the opposite upper or inlet-valve, thus restoring to the valve its equilibrium, and yet permit of wear of its support without interfering with its proper functions. The only pressure which will be desirable upon the valves under the above arrangement will be one sufficient to insure the sudden change or tilting of it, which will be very light.

The packing $k$ is not a necessity, and may be dispensed with, provided the joint between the valve and its tubular seat be a perfectly tight one; but I prefer to use the said packing or an equivalent therefor.

I have represented in the accompanying drawing two different valves, in order to show that I am not confined to a precise construction so long as I retain the character of a piston or plunger.

I claim—

1. The combination, in a fluid-meter such as described, with the wall D and connecting-rod H, of the tubular packing-piece $k$, arranged in a recess countersunk in that part of the wall surrounding the connecting-rod, as and for the purposes shown and set forth.

2. The combination, with the valve-seats in a diaphragm fluid-meter, such as described, of two balanced piston-valves, connected together, and constructed and arranged to operate in the manner shown and set forth.

JOHN MEAD.

Witnesses:
EDWARD GRIFFITH,
CHARLES H. MILLS.